US012686130B2

(12) United States Patent
    Kirsten et al.

(10) Patent No.: US 12,686,130 B2
(45) Date of Patent: Jul. 21, 2026

(54) MODELING A ROBOT WORKING ENVIRONMENT

(71) Applicant: ABB Schweiz AG, Baden (CH)

(72) Inventors: René Kirsten, Fernwald (DE); Nima Enayati, Mannheim (DE); Arne Wahrburg, Weiterstadt (DE); Mikael Norrlöf, Norrköping (SE); Morten Akerblad, Västeras (SE)

(73) Assignee: ABB Schweiz AG, Baden (CH)

( * ) Notice: Subject to any disclaimer, the term of this patent is extended or adjusted under 35 U.S.C. 154(b) by 43 days.

(21) Appl. No.: 18/751,797

(22) Filed: Jun. 24, 2024

(65) Prior Publication Data

US 2024/0342914 A1    Oct. 17, 2024

Related U.S. Application Data

(63) Continuation of application No. PCT/EP2021/087567, filed on Dec. 23, 2021.

(51) Int. Cl.
    B25J 9/16        (2006.01)
(52) U.S. Cl.
    CPC ........... B25J 9/1679 (2013.01); B25J 9/1661 (2013.01)
(58) Field of Classification Search
    CPC ..... B25J 9/1679; B25J 9/1661; G05B 19/401; G05B 19/4207; G05B 2219/37021; G05B 2219/37043
    See application file for complete search history.

(56) References Cited

U.S. PATENT DOCUMENTS

| 4,959,523 | A | 9/1990 | Fihey et al. |
| 6,192,297 | B1 | 2/2001 | Marobin |
| 6,493,607 | B1 | 12/2002 | Bourne et al. |

(Continued)

FOREIGN PATENT DOCUMENTS

| WO | WO 2013/126163 A1 | 8/2013 | |
| WO | WO-2017032407 A1 * | 3/2017 | ............ B25J 9/1692 |

OTHER PUBLICATIONS

Li et al., Stable and Compliant Motion of Physical Human-Robot Interaction Coupled With a Moving Environment Using Variable Admittance and Adaptive Control, *IEEE Robotics and Automation Letters* (L-RA), 3(3): 2493-2500 (Jul. 2018).

(Continued)

*Primary Examiner* — Abby Lin
*Assistant Examiner* — Danielle M Jackson
(74) *Attorney, Agent, or Firm* — Whitmyer IP Group LLC

(57)                ABSTRACT

A method for modeling a working environment of a robot comprising providing a robot having a base, a reference point, a plurality of links by which the reference point is movably connected to the base, and sensors for detecting positions of or angles between the links, providing a controller adapted to associate a position of the reference point to detected positions or angles between of the links, installing the base in a working environment which is delimited by at least one surface, moving the reference point to at least one sample point of the at least one surface, determining the position of the sample point from positions of or angles between the links detected while the reference point is at the sample point, and inferring the position of the surface from the determined position.

8 Claims, 3 Drawing Sheets

(56) References Cited

U.S. PATENT DOCUMENTS

| | | | |
|---|---|---|---|
| 2008/0271332 A1 * | 11/2008 | Jordil .................. | G01B 21/047 |
| | | | 33/503 |
| 2011/0196533 A1 | 8/2011 | Scheurer et al. | |
| 2019/0299415 A1 * | 10/2019 | Pollack ............ | G01N 35/00693 |
| 2020/0070343 A1 * | 3/2020 | Thomaz .................. | B25J 9/163 |
| 2021/0370507 A1 * | 12/2021 | Corcodel .............. | B25J 9/1664 |
| 2023/0020518 A1 * | 1/2023 | Chiba .................. | B25J 9/1679 |

OTHER PUBLICATIONS

European Patent Office, International Search Report in International
Patent Application No. PCT/EP2021/087567, 4 pp. (Aug. 10, 2022).
European Patent Office, Written Opinion in International Patent
Application No. PCT/EP2021/087567, 7 pp. (Aug. 10, 2022).

\* cited by examiner

Fig. 1
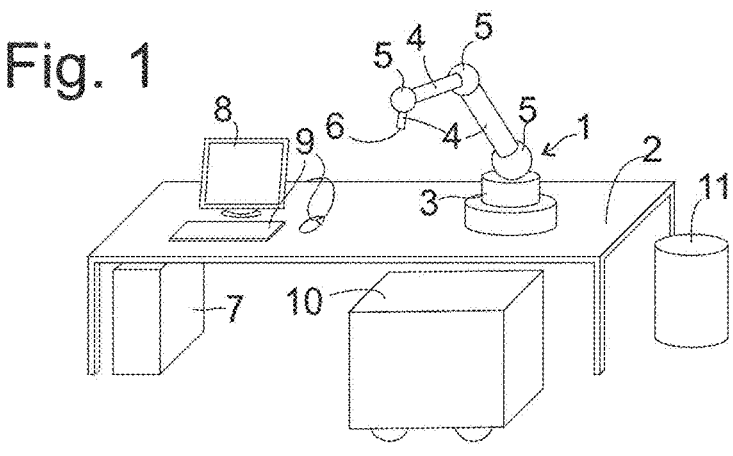
Fig. 2
Fig. 3
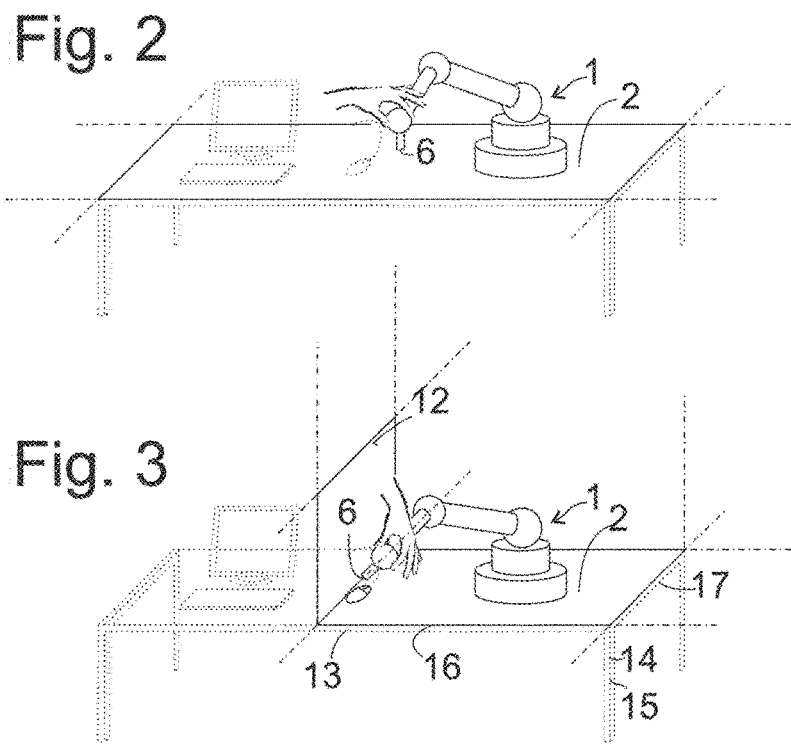
Fig. 4
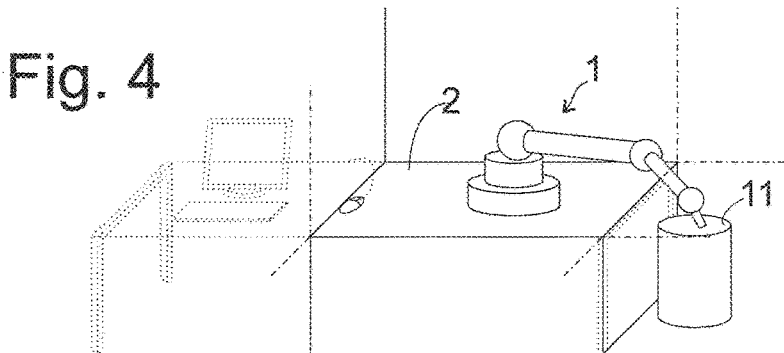

MODELING A ROBOT WORKING ENVIRONMENT

CROSS-REFERENCE TO RELATED APPLICATIONS

The instant application claims priority to International Patent Application No. PCT/EP2021/087567, filed Dec. 23, 2021, which is incorporated herein in its entirety by reference.

FIELD OF THE DISCLOSURE

The present disclosure relates to methods and apparatus for modelling a working environment of a robot.

BACKGROUND OF THE INVENTION

The availability of an accurate model of the working environment of a robot, i.e. the knowledge of the coordinates of physical or virtual surfaces which the robot should not touch or pass, is a prerequisite for collision-free motion planning in robotic systems. Conventionally, this environmental model is derived from CAD models of the robotic system, used commonly for offline planning of the system, or is approximated using computer vision systems (e.g. RGBD cameras, or Lidar) mounted at/near the system.

CAD data aren't always available, in particular for robotic systems involving a small, portable robot which can ad hoc be transported to a site where it is needed for a particular job, and installed there. Typically, is such a case, a computer vision system would be used to generate images of the site and derive from these e.g. positions of obstacles which the robot, in operation, will have to avoid. The need to install such a computer vision system adds significantly to the operating cost of the robot, and can make the use of the robot uneconomic for small jobs. Further, setting up the computer vision system so that a reliable and complete model of the environment is obtained requires skilled technicians who may not be readily available.

BRIEF SUMMARY OF THE INVENTION

There is a need, therefore, for simpler techniques for modeling a working environment of a robot. In particular, if such techniques were simple enough to be used by less qualified staff, they would make the use of robots attractive to users for whom it used not to be economical due to the high cost of adapting a robotic system to a new job. According to a first aspect of the present disclosure, a method for modeling a working environment of a robot comprises the steps of (a) providing a robot comprising a base, a reference point, a plurality of links by which the reference point is movably connected to the base, and sensors for detecting positions of or angles between the links, (b) providing a controller for the robot, the controller being adapted to associate a position of the reference point to detected positions of or angles between the links, (c) installing the base in a working environment which is delimited by at least one surface, (d) moving the reference point to at least one sample point of the at least one surface, (e) determining the position of the sample point from positions of or angles between the links detected while the reference point is at the sample point, and (f) inferring the position of the surface from the determined position. In most existing robotic systems, the controller is adapted to determine the pose of the robot from data provided by built-in sensors of the robot, in order to allow closed-loop control of the position of an end effector of the robot. The invention uses this capability by allowing the robot's reference point to be guided to a sample point of the surface, deriving coordinates of the reference point from the sensor data, and taking these coordinates as those of the sample point.

This method involves the robot's reference point moving to places where in normal operation it should not go, in order to avoid damage to the robot or to objects to which the surfaces thus detected belong. However, when step d) is carried out under manual control by a human user, care can be taken that the surfaces are approached at a speed or with a force low enough to avoid any damage.

As a further measure of precaution, the reference point of the robot might be part of a tool provided specifically for carrying out the method of the invention, and which may yield when touching the surface.

Manual control may be carried out by the user inputting commands to the controller, e.g. using a jogging device, a 3D mouse or the like, and the controller displacing the reference point according to these commands. However, most input devices of this type cannot provide feedback to the user when contact takes place, so that possibly damaging contact forces may still occur if the user isn't attentive. According to a preferred alternative, therefore, the controller supports a lead through mode of the robot, in which step d) is carried out by displacing the reference point by hand. The user's hand will not fail to feel when contact with the surface is made, or the user may even prefer to stop moving the robot before its reference point touches the surface.

According to another alternative, the controller may support an exploration mode of the robot, in which step d) is carried out by the controller controlling displacement of the reference point along a path. In this exploration mode, the controller "blindly" feels its way through the environment, recording, on a given path, where it is free to go, and where it is blocked by a surface. By repeating step d), an arbitrary number of sample points can be determined, so that the model can be obtained with any degree of precision required. Since this can be done without supervision by a user, the time needed for obtaining the model is not an issue.

In order to prevent small objects or isolated projections from a surface from being overlooked in this process, a proximity sensor may be associated to the reference point of the robot.

For the exploration mode mentioned above, it is essential that the reference point is contact sensitive, so that step e) is triggered by the reference point sensing contact with a surface. Such contact sensitivity is also helpful when the movement of the reference point is controlled manually, as it saves the user the effort of triggering step e) manually whenever a contact has occurred.

Whenever three sample points have been recorded, the surface in between may be modeled by interpolation, assuming it to be plane. Such a procedure is laborious and not very precise, in particular when the true surface is curved. Labor can be significantly reduced, and precision can be increased by a step of g) selecting a geometric type of the at least one surface among a plurality of predefined types, wherein each of the predefined types has a predetermined sample number $n$ associated to it, and by carrying out step f) after steps d) and e) have been carried out at least $n$ times.

When the selected type is a horizontal plane, just $n=1$ contact is sufficient to determine its vertical coordinate. When a vertical plane is selected, $n=2$ contacts are sufficient. Only for a general plane, which can have any inclination, $n=3$ contacts will be necessary to determine its position. A sphere will require n=4 contacts, an ellipsoid n=6, a cylinder n=3, a cone n=4. All those types are easy to distinguish visually for the user who is controlling the movement of the reference point.

Whenever more than the minimum number n of sample points is obtained for a given surface, the coordinates of the surface can be obtained by a fitting procedure. The quality of the fit can be judged, and if it is judged insufficient, a warning can be output to the user, so that the user may rethink and possibly correct the type of the surface, and/or delete an inaccurate sample point and/or add sample points.

When positions of two or more surfaces have thus been determined, at least one line may be determined in which the surfaces intersect. This line may then assumed to be a border of the surfaces.

According to another aspect of the invention, the object is achieved by a controller for a robot comprising a base, a reference point, a plurality of links by which the reference point is movably connected to the base, and sensors for detecting positions of or angles between the links, the controller being adapted to receive positions of or angles between the links detected by the sensors, associate a position of the reference point to the detected positions, and, when the reference point is located at a sample point of a surface delimiting a working environment of the robot, to determine the position of the sample point from positions of or angles between the links detected while the reference point is at the sample point, and infer the position of the surface from the determined position.

Such a controller may comprise a user interface enabling a user to select a geometric type of the surface among a plurality of predefined types.

According to still another aspect of the invention, the object is achieved by a computer-readable storage medium having stored thereon a plurality of instructions which, when executed by a processor, cause the processor to operate as a controller as described above and/or to carry out at least steps e) and f) of the above method.

BRIEF DESCRIPTION OF THE SEVERAL VIEWS OF THE DRAWING(S)

Further features and advantages of the invention will become apparent from the subsequent description of embodiments, referring to the appended drawings.

FIG. 1 is a schematic view of a robot in its working environment;

FIGS. 2, 3, and 4 illustrate steps of the process of modeling the working environment;

DETAILED DESCRIPTION OF THE INVENTION

Figure 5:
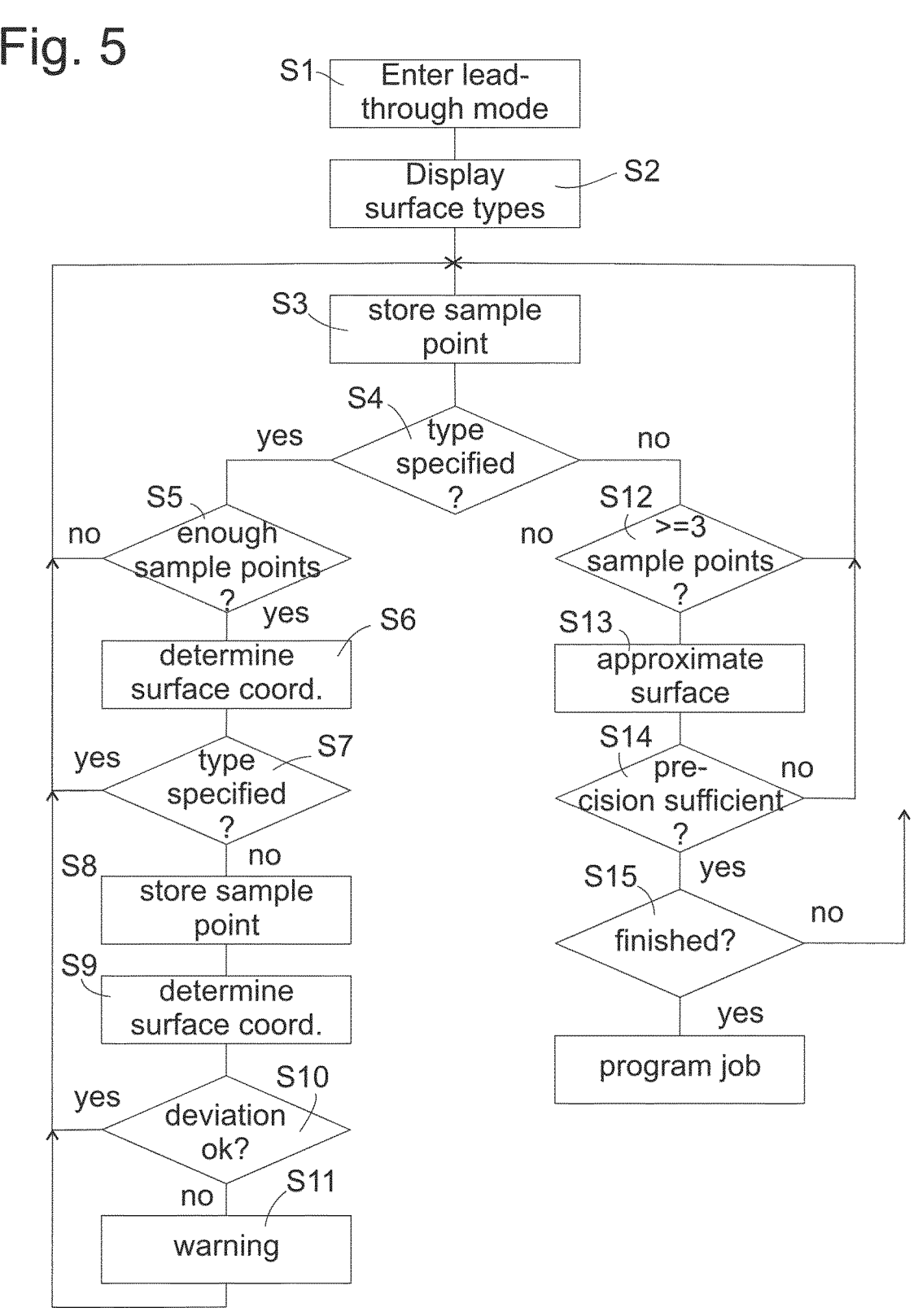
FIG. 5 is a flowchart of the modeling method.

FIG. 1 is a schematic view of a robot 1 placed on a desk 2. The robot 1 is a conventional articulated robot with a stationary base 3 and a plurality of links 4 rotatably connected to each other and the base 3 by joints 5. The most distal member carries a reference point 6. Internal angle sensors, not shown, of the robot detect the angles of all joints 5, and are connected to a controller 7, thus enabling the controller 7 to calculate the position of the reference point 6 relative to the base 3 in a three-dimensional coordinate system.

A monitor 8 and input devices 9 for the controller 7 such as a keyboard or a mouse are also placed on the desk 2, possibly within reach of the robot 1. Next to the desk, there are a trolley 10 and a waste bin 11. Let us assume that the robot 1 is to be trained for a job which involves taking a workpiece from the trolley 10, removing something from it that is then thrown into the waste bin 11. While doing that, the robot must keep clear of a user who is sitting at the desk 2 next to the monitor 8 and is working on the program which will control the job of the robot 1.

When the robot 1 has recently been placed on the desk, the controller 7 has no information about the working environment. The user therefore activates a lead through mode of the robot 1 using one of input devices 9 (Step S1 of FIG. 5). In the lead through mode, the robot 1 is controlled to remain stationary while no force other than gravitation is acting on it, and to yield to any non-gravitation force that is applied to it. While the robot 1 moves under such non-gravitation force, the controller 7 continuously records angles detected by the angle sensors of the robot, in order to be able to reproduce these in a subsequent production mode.

On the monitor 8, a list of types of surfaces is displayed, inviting the user to specify one using the input devices 9 (S2). The user guides the reference point 6 to a surface whose coordinates he intends to have detected. In the case of FIG. 2, this surface is the top surface of the desk 2. In this Fig. the reference point 6 is in contact with the desk 2. By gently pressing the reference point 6 onto the desk, the user activates a pressure sensor in the distal link, which, in turn causes the controller 7 to calculate coordinates of the reference point 6 from the detected angles, and to store these as a sample point of a surface of the working environment (S3). Alternatively, a button or other appropriate input means can be provided which is operated by the user to trigger calculation of the coordinates of the reference point when the user finds the reference point to be correctly placed.

Step S4 checks whether the user has selected a type of surface. If yes, step S5 verifies whether enough sample points have been stored to define the position of the surface. Before or after recording the sample point, the user has specified that it belongs to a horizontal plane. The position of the horizontal plate is uniquely defined by n=1 sample point. Assuming that the sample point has coordinates ($x_1$, $y_1$, $z_1$), the controller 7 determines in step S6 that there is a horizontal plane delimiting the working environment at z=21. Since it can be inferred from the detected angles that the robot 1 is located in the half-space z>21, all points having a z coordinate <21 are excluded from the working environment. FIG. 2 illustrates the result by showing the top surface of the desk 2 in solid lines, and, since edges of the desk 2 are not yet included in the model of the working environment, dash-dot lines extending beyond the edges of the desk 2. Objects not yet included in the model, such as legs of the desk and objects on it are represented by dotted lines.

At this stage, the controller 7 might generate a signal, preferably an audible signal, to inform the user that all data required for the selected type of surface have been acquired, so as to invite him to choose the type of a next surface to be detected. If it is found in step S7 that the user has done so, the process returns to S3 in order to collect the first sample point of the next surface. Else a next sample point obtained in step S8 is assumed to belong to the surface whose coordinates had already been determined in step S6.

FIG. 3 shows the robot 1 in the process of acquiring another sample point on the top surface of desk 2. If the sample point is acquired in step S8, the controller re-calculates in step S9 the position of the desktop surface taking into account both sample points. Generally, such a re-calculation can be done by fitting the surface to the sample points, e.g. using a least-squares algorithm. When in step S10 the distance between the surface thus obtained and at least one of the sample point is found to exceed a predetermined threshold, a warning can be output (S11), inviting the user to, at his discretion, delete specified sample points (which may be appropriate if sample points were obtained unintentionally and do in fact not belong to the surface to be detected), collect more sample points (for example when the surface is rough, and the specified surface type is merely an approximation) or change the specified surface type.

Let us assume that prior to the sample point acquisition of FIG. 3 the user has specified the type of the next surface to be detected to be a vertical plane. The number n of points needed to define the position of a vertical plane is 2. S4 is therefore executed once more before the controller 7 will, in step S6, determine the coordinates of a vertical plane 12 which is physically non-existent but which the user has defined absolutely arbitrarily. Plane 12 is represented partly in solid lines, partly in dash-dot lines like the top of desk 12 since in the model of the working environment, plane 12 divides the desk 2 into two parts, one in which the robot 1 is free to move, and another, which, although physically accessible to the robot, has been excluded from its working environment, thus ensuring that the user can work there without being molested by the robot 1.

Let us assume that a next surface to be detected it that of the mouse. The outer surface of the mouse might be approximated as an ellipsoid. In order to define an ellipsoid, at least n=5 sample points on its surface must be known. So one possibility for modeling the mouse would be to select ellipsoid as the surface type, repeat step S3 at least five times, and then calculate the ellipsoid.

Alternatively, the user might specify no surface type at all, repeat S3 until at least three sample points are obtained (S12), and have the controller 7 approximate the shape of the surface by a set of planes, each of which is defined by three of the sample points and which, if there are two or more planes, intersect along a line defined by two of these sample points (S13). The number of samples (S3) can be incremented as often as necessary to achieve a desired precision of the approximation. A judgment (S14) whether the precision is sufficient may be carried out by the user, based on a perspective view of the set of triangles generated by controller 7 and displayed on monitor 8. When the precision is judged to be sufficient, modeling of the environment is either finished, and the user can start programming the job the robot is meant to execute in this environment, or the user starts detecting another surface (S15).

In the example of FIGS. 1-4, this latter type of surface detection can also be used for the sides of desk 2: instead of specifying these to be vertical planes, the user specifies no type at all and guides the reference point to points 13, 14, 15 (see FIG. 3) at the front side of the desk 2. The controller 7 calculates a first plane extending through points 13, 14, 15 in step S13, identifies a front edge 16 along which the first plane intersects the top surface detected before, and adds to the working environment the space below the top surface and in front of the first plane, thereby enabling the robot to seize objects from the trolley even if these are located at a level lower than the top surface.

In a subsequent iteration of step S3, the user has the reference point 6 touch a point 17 at the side of desk 2. The controller identifies a new plane, comprising points 14, 15, 17. Since points 14 and 15 are located at an outer edge 18 of a leg of desk 2, this plane coincides with a lateral side of the desk. The controller 7 then adds to the working environment the space below the top surface and beyond the lateral side. This is necessary for the robot 1, in production mode, to be allowed to reach beneath the level of the top surface and reach the waste bin 11 there.

According to a further alternative, coordinates of a complex surface can be gathered by bringing the reference point 6 into contact with the surface, activating a continuous recording mode in which coordinates are gathered not of individually specified sample points but of all points lying on a path followed by the reference point, and, in this continuous recording mode, displacing the reference point along the surface of the object.

In order to enable proper disposal of the waste, the controller 7 still has to learn the position and the shape of the waste bin 11. To this end, the user declares to the controller that the next surface to be detected is a vertical cylinder, which in this case is a good approximation of the shape of the waste bin. The perimeter of the waste bin 11 can be determined by detecting three sample points thereon. In order to specify the height of the waste bin, the user defines that a next surface to be detected is a horizontal plane, and has the reference point touch the upper rim of the waste bin 11. The model doesn't have to specify whether the waste bin is hollow in order to enable proper dropping of waste, it is sufficient for the controller to "know" where the upper side of the bin is located. Specifying a body to be hollow is feasible, though, by choosing the sample points on the inner side of its wall.

Figure 6:
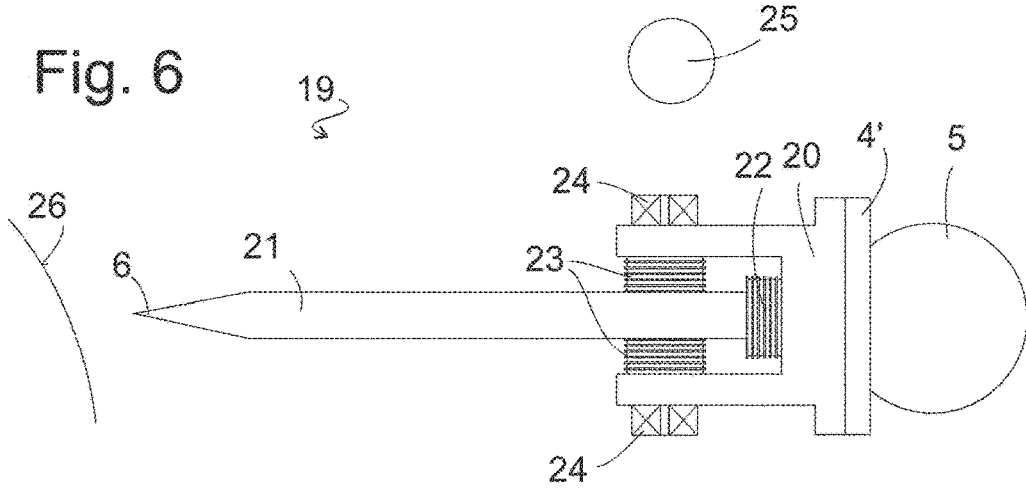
FIG. 6 illustrates an end effector that can be used in the method of the present invention.

In principle, the reference point 6 might be a prominent point on any tool that can be mounted on the robot and that preferably has a sensor for sensing a force between the reference point and a sample point contacted by it. FIG. 6 illustrates an end effector 19 which is specifically adapted for the present invention. It has a base 20 removably connected to the distal link 4' of the robot 1. The base 20 forms a socket for a pin 21, preferably made of a moderately rigid, elastic material. A first pressure sensor 22 is located between a proximal end of the pin 21 and a bottom of the socket, so as to detect the pin 21 pressing against an obstacle in its axial direction. Second pressure sensors 23 are arranged circumferentially around the pin 21 in a radial force acting on the pin and its direction. When the controller 7 evaluates signals from all these sensors 22, 23, it can detect not only a contact of the pin 21 with a sample point, but it can also estimate the direction of a surface normal at the sample point.

Proximity sensors 24 are arranged circumferentially on the outside of the base 20. When the end effector 19 is guided by hand as described above, data from the pressure sensors 22 and 23 can be used to check plausibility of the model obtained as described above, e.g. by comparing the surface normal a sample point would be expected to have based on the model with the actual surface normal as derived from the sensors 22, 23. In a second embodiment of the invention, they are more important.

In this second embodiment, the controller 7 supports an exploration mode in which the robot 1, after having been placed in a new environment, is controlled to scan this environment by systematically moving its reference point 6 along a plurality of paths. The paths can a priori be parallel and spaced densely enough for any object 25 which is not directly touched by the pin at least to be sensed by the proximity sensors 24. In the exploration mode, the advancing speed of the reference point 6 can be set low enough to ensure that when the pin 21 touches an object surface 26, contact is sensed and the movement is stopped before the surface 26 or the pin 21 is damaged. When such contact takes place, since the surface normal of the sample point can be estimated, it is possible to extrapolate where the surface will extend in the vicinity of the contact point. By systematically moving the reference point 6 to locations where, based on the extrapolation, other points of the surface are expected, a large number of sample points can be acquired, and a detailed model of the surface formed in a short time.

Based on direction information obtained from the proximity sensors 24 when passing by object 25, the object 25 can be searched for systematically, and when contact has been made, further sample points can be gathered from it in a short time. In this way, a detailed model of the new environment can be obtained even without human assistance.

Figure 7:
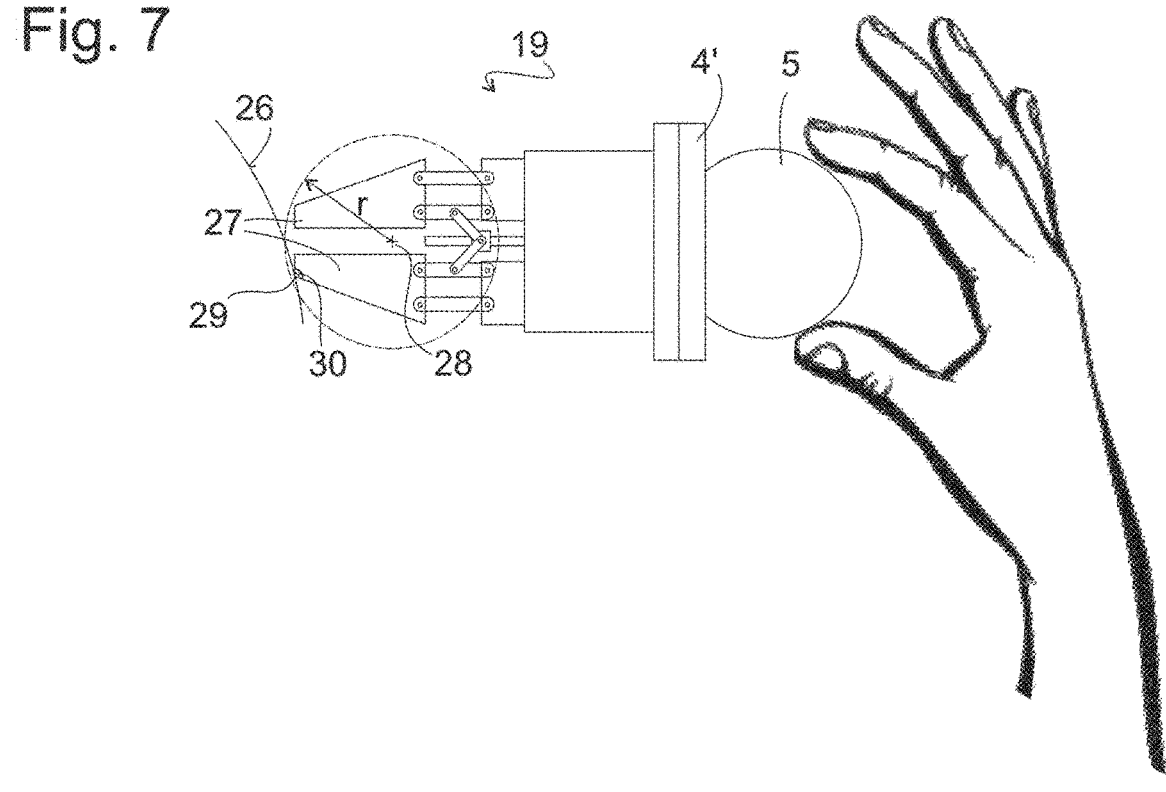
FIG. 7 illustrates an alternative end effector.

In the first embodiment of the invention, i.e. when the reference point 6 is displaced manually by a user, it can be assumed that the user will notice any objects such as 25, and have the system acquire coordinates of the object 25 by guiding the reference point 6 to the surface of the object, so that proximity sensors such as 24 aren't necessary for finding the object. In that case, any conventional end effector can be used. For example, in FIG. 7, the end effector 19 is a gripper having two or more symmetrically displaceable clamping jaws 27. A tool center point (TCP) 28 is defined in the middle between the jaws 27. Using his hand, a user brings the gripper into contact with a surface 26. Since the gripper has no sensors capable of detecting the contact, other input means are needed for informing the controller of the contact. For example, the user may be required to press a predetermined key on one of input devices 9 whenever controller 7 is to record coordinates of the TCP 28. As the controller cannot tell where and on which one of clamping jaws 27 contact has occurred, the coordinates of the point of surface 26 that has been touched cannot be determined exactly, but when controller 7 assumes that the coordinates of this point are those of the TCP 28, the error cannot be larger than r.

Alternatively, when the user employs a jogging device, a 3D mouse or the like for inputting into controller 7 a direction in which the end effector 19 is to move, and controller 7 controls the robot 1 according to this input, contact of the end effector with surface 26 will cause a torque detected at least one of joints 5 to deviate from the value that would be expected for the current pose of the robot. So, whenever such a deviation is observed, the controller 7 concludes that a surface has been touched and records current coordinates of the TCP 28.

The TCP 28 located between the jaws 27 facilitates controlling a seizing operation by the gripper, since the gripper will be in an adequate position therefore whenever the TCP overlaps with the object to be seized, and the distance between the jaws 27 is large enough for the object to fit in between. Such a TCP is not ideal for acquiring coordinates of a surface, since, as could be seen above, the surface will not be located exactly at the TCP. The controller 7 may therefore be adapted to assign at least two different TCPs to an end effector, depending on whether the end effector is being used for its original purpose or for acquiring coordinates. A TCP 29 used for coordinate acquisition is located at a prominent point on the surface of the end effector 19, preferably at an acute corner or protrusion thereof. The user will then have to take into account, when guiding the end effector, that an accurate acquisition of coordinates is possible only when the TCP 29, and not some other point of the end effector 19, touches the surface 26, but when that is so, the accuracy of coordinate acquisition equals the positioning accuracy of the robot 1. The TCP 29 can be labelled, e.g. by a paint dot 30, in order to distinguish it clearly from other similar prominent points of the end effector.

REFERENCE NUMERALS 1 robot
2 desk
3 base
4 link
5 joint
6 reference point
7 controller
8 monitor
9 input device
10 trolley
11 waste bin
12 vertical plane
13 point
14 point
15 point
16 front edge
17 point
18 outer edge
19 end effector
20 base
21 pin
22 first pressure sensor
23 second pressure sensor
24 proximity sensor
25 object
26 object surface
27 jaw
28 TCP
29 TCP
30 paint dot All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for modeling a working environment of a robot comprising the steps of:

a) providing a robot comprising a base, a reference point, a plurality of links by which the reference point is movably connected to the base, and sensors for detecting positions of or angles between the links, b) providing a controller for the robot, the controller being adapted to associate a position of the reference point to detected positions or angles between of the links, c) installing the base in a working environment which is delimited by at least one surface, d) moving the reference point to at least one sample point of the at least one surface, wherein the controller supports an exploration mode of the robot, in which step d) is carried out by the controller controlling displacement of the reference point along a path, e) determining the position of the sample point from positions of or angles between the links detected while the reference point is at the sample point, wherein the reference point is contact sensitive, wherein step e) is triggered by the reference point sensing contact with the surface, wherein the robot comprises an end effector which has a pin, wherein a first pressure sensor is located between a proximal end of the pin and a bottom of a socket to detect the pin pressing against an obstacle in its axial direction, wherein second pressure sensors are arranged circumferentially around the pin to detect a radial force acting on the pin and a direction of the radical force, wherein the controller evaluates signals from the sensors to detect contact of the pin with the at least one sample point and to estimate a direction of a surface normal at the at least one sample point, and f) inferring the position of the surface from the determined position, wherein the controller extrapolates where the surface will extend in a vicinity of the at least one sample point from the estimated direction of the surface normal at the at least one sample point.

2. The method of claim 1, further comprising step g) selecting a geometric type of the at least one surface among a plurality of predefined types, wherein each of the predefined types has a predetermined sample number n associated to it, and wherein step f) is carried out after steps d) and e) have been carried out at least n times.

3. The method of claim 2, wherein the plurality of geometric types comprises one or more of a horizontal plane, a vertical plane, an arbitrarily oriented plane, a sphere, an ellipsoid, a cylinder, a cone.

4. The method of claim 1, wherein step f) comprises fitting the surface to the determined positions, and assessing a quality of the fit.

5. The method of claim 1, wherein the working environment is delimited by a plurality of surfaces, further comprising the step of h) determining, for at least two of the surfaces, at least one line in which the surfaces intersect, and assuming the line as a border of the surfaces.

6. A controller for a robot comprising a base, a reference point, a plurality of links by which the reference point is movably connected to the base, and sensors for detecting positions of or angles between the links, the controller being adapted to:

receive positions of or angles between the links detected by the sensors, associate a position of the reference point to the detected positions, and, when the reference point is located at a sample point of a surface delimiting a working environment of the robot, to determine the position of the sample point from positions of or angles between the links detected while the reference point is at the sample point, wherein the reference point is contact sensitive, wherein determination of the position of the sample point is triggered by the reference point sensing contact with the surface, wherein the robot comprises an end effector which has a pin, wherein a first pressure sensor is located between a proximal end of the pin and a bottom of a socket to detect the pin pressing against an obstacle in its axial direction, wherein second pressure sensors are arranged circumferentially around the pin to detect a radial force acting on the pin and a direction of the radical force, wherein the controller is configured to evaluate signals from the sensors to detect contact of the pin with the sample point and to estimate a direction of a surface normal at the sample point, and infer the position of the surface from the determined position, wherein the controller extrapolates where the surface will extend in a vicinity of the sample point from the estimated direction of the surface normal at the sample point.

7. The controller of claim 6, further comprising a user interface enabling a user to select a geometric type of the surface among a plurality of predefined types.

8. A robotic system comprising:

a robot comprising a base, a reference point, a plurality of links by which the reference point is movably connected to the base, and sensors for detecting positions of or angles between the links, and a controller associated with the robot, the controller being adapted to:

receive positions of or angles between the links detected by the sensors, associate a position of the reference point to the detected positions, and, when the reference point is located at a sample point of a surface delimiting a working environment of the robot, to determine the position of the sample point from positions of or angles between the links detected while the reference point is at the sample point, wherein the reference point is contact sensitive, wherein determination of the position of the sample point is triggered by the reference point sensing contact with the surface, wherein the robot comprises an end effector which has a pin, wherein a first pressure sensor is located between a proximal end of the pin and a bottom of a socket to detect the pin pressing against an obstacle in its axial direction, wherein second pressure sensors are arranged circumferentially around the pin to detect a radial force acting on the pin and a direction of the radical force, wherein the controller is configured to evaluate signals from the sensors to detect contact of the pin with the sample point and to estimate a direction of a surface normal at the sample point, and infer the position of the surface from the determined position, wherein the controller extrapolates where the surface will extend in a vicinity of the sample point from the estimated direction of the surface normal at the sample point.

* * * * *